(12) United States Patent
Ganesh et al.

(10) Patent No.: US 6,684,223 B1
(45) Date of Patent: Jan. 27, 2004

(54) PERFORMING 2-PHASE COMMIT WITH PRESUMED PREPARE

(75) Inventors: Amit Ganesh, Mountain View, CA (US); Gary C. Ngai, Saratoga, CA (US)

(73) Assignee: Oracle International Corporation, Redwood Shores, CA (US)

( * ) Notice: Subject to any disclaimer, the term of this patent is extended or adjusted under 35 U.S.C. 154(b) by 100 days.

(21) Appl. No.: 10/125,911

(22) Filed: Apr. 18, 2002

Related U.S. Application Data

(62) Division of application No. 09/222,407, filed on Dec. 29, 1998.

(51) Int. Cl.[7] ............................................. G06F 17/00
(52) U.S. Cl. ........................ 707/200; 707/201; 707/202; 707/101
(58) Field of Search ........................ 707/1–10, 200–206, 707/100–104.1

(56) References Cited

U.S. PATENT DOCUMENTS

| | | | | |
|---|---|---|---|---|
| 6,587,860 B1 | * | 7/2003 | Chandra et al. | ............ 707/202 |
| 6,609,128 B1 | * | 8/2003 | Underwood | ................ 707/200 |
| 6,615,253 B1 | * | 9/2003 | Bowman-Amuah | ......... 707/100 |

OTHER PUBLICATIONS

Torp et al., Efficient differential timeslice computation, Knowledge and Data Engineering, IEEE Transactions on, vol. 10, Issue 4, Jul.–Aug. 1998, pp. 599–611.*

Li et al., Post–crash log processing for fuzzy checkpointing main memory databases, Data Engineering, 1993, Proceedings, Ninth International Conference on, Apr. 19–23, 1993, pp. 117–124.*

Norvag, A performance evaluation of log–only temporal object databases systems, Scientific and Statistical Database Management, 2000, Proceedings, 12th International Conference on, Jul. 26–28, 2000, pp. 256–258.*

* cited by examiner

*Primary Examiner*—David Jung
(74) *Attorney, Agent, or Firm*—Marcel K. Bingham; Hickman Palermo Truong & Becker LLP

(57) ABSTRACT

A mechanism for performing a two-phase commit is provided. The mechanisms perform a two-phase commit in a manner that reduces the number of messages transmitted between a coordinating database system and the participating database systems, and the number of log flushes performed to complete a two-phase commit. To determine whether a particular participating database system is prepared to commit, the coordinating database system first examines external log tracking data that resides on the coordinating database system. External log tracking data, which indicates various states of logs on other database systems, is used to determine whether or not a particular participating database system is prepared to commit.

6 Claims, 10 Drawing Sheets

Forget Collector 370

Transaction Forget List 340

| Transaction ID 342 | Commit Log Rcd 344 | Coordinator ID 346 |
|---|---|---|
| A | 956 | 310 |
| B | 1042 | 310 | record 348
record 349

Transaction Participant Table 332

FIG. 3C

PERFORMING 2-PHASE COMMIT WITH PRESUMED PREPARE

RELATED APPLICATION

This patent application is a divisional of and claims priority from U.S. patent application Ser. No. 09/222,407, entitled "Performing 2-Phase Commit With Presumed Prepare", filed by Amit Ganesh and Gary C. Ngai, on Dec. 29, 1998, the contents of which are herein incorporated by reference in its entirety.

FIELD OF THE INVENTION

The present invention relates to providing atomicty of transactions on a database system, and in particular, to two-phase commits.

BACKGROUND OF THE INVENTION

One of the long standing challenges in distributed computing has been to maintain data consistency across all of the nodes in a network. Perhaps nowhere is data consistency more important than in distributed database systems, where a distributed transaction may specify updates to related data residing on different database systems. To maintain data consistency, all changes made in all database systems by the distributed transaction must be either committed or, in the event of an error, "rolled back". When a transaction is committed, all of the changes to data specified by the transaction are made permanent. On the other hand, when a transaction is rolled back, all of the changes to data specified by the transaction already made are retracted or undone, as if the changes to the data were never made.

One approach for ensuring data consistency when processing distributed transactions is referred to as "two-phase commit". According to the two-phase commit approach, one database system (the coordinating database system) is responsible for coordinating the commitment of the transaction on one or more other database systems. The other database systems that hold data affected by the transaction are referred to as participating database systems.

A two-phase commit involves two phases, the prepare phase and the commit phase. In the prepare phase, the transaction is prepared in each of the participating database systems. When a transaction is prepared on a database system, the database is put into such a state that it is guaranteed that modifications specified by the transaction to the database data can be committed. When all participants involved in a transaction are prepared, the prepared phase ends and the commit phase may begin.

In the commit phase, the coordinating database system commits the transaction on the coordinating database system and on the participating database systems. Specifically, the coordinating database system sends messages to the participants requesting that the participants commit the modifications specified by the transaction to data on the participating database systems. The participating database systems and the coordinating database system then commit the transaction. Finally, the participating database systems transmit a message acknowledging the commit to the coordinating database system.

On the other hand, if a participating database system is unable to prepare, or the coordinating database system is unable to commit, then at least one of the database systems is unable to make the changes specified by the transaction. In this case, all of the modifications at each of the participants and the coordinating database system are retracted, restoring each database system to its state prior to the changes.

The two-phase commit ensures data consistency while providing simultaneous processing of modifications to distributed databases. However, these benefits are not achieved without costs. Such costs include network traffic that occurs as a result of transmitting requests to prepare and commit from the coordinating database system to the participants, and of transmitting acknowledgements from the participants to the coordinating database system. Another cost is the increased latency experienced by a database system involved in a distributed transaction in waiting for other database systems to become prepared.

FIG. 1 shows a distributed database system used to illustrate in more detail the costs associated with the two-phase commit performed according to a conventional approach for performing a two-phase commit. Distributed database systems 100 includes a coordinating database system 110 and a participating database system 150. Database system 110 receives requests for data from database clients 120, which include client 122 and client 124. Such requests may be in the form of, for example, SQL statements.

Coordinating database system 110 includes a log, such as log 112. The log 112 is used to record modifications made to the database system, and other events affecting the status of those modifications, such as commits. Log 112 contains a variety of log records. When these log records are first created, initially they are stored in volatile memory, and are soon stored permanently to non-volatile storage (e.g. a non-volatile storage device such as a disk). Once log records are written to non-volatile storage, the modifications and other events specified by the log records are referred to as being "persistent". The modifications and events are "persistent" because the permanently stored log records may be used, in the event of a system failure, after the failure to replay the modifications and events to restore the database to its pre-failure state.

For example, log 112 may contain redo records, which are used to record database operations such as INSERT, UPDATE, DELETE, CREATE, ALTER, or DROP. When a transaction modifies data in a database system, a redo record that specifies the modification is added to the log. To make the modifications permanent, a commit command is issued to database system 110. In response, database system 110 records the commit in a log record of log 112 referred to as a commit record. When a failure occurs after the redo records and the log record reflecting the commit are stored in non-volatile storage, the database may be modified based on the redo records.

FIG. 2 is a state diagram showing transaction states associated with a transaction as it progresses through the phases of a two-phase commit, and the steps that are performed before transitioning between various transaction states according to a conventional approach for performing a two-phase commit. The transaction states are illustrated using distributed database systems 100 as an example. Transaction states 201 are the transaction states that a transaction goes through within a coordinating database system (i.e. coordinating database system 110), and transaction states 202 are the transaction states a transaction goes through within a participating database system (i.e. participating database system 150).

Referring to FIG. 2, inactive states 210, 240, 250, 290 represent the inactive state of a transaction being processed on a distributed database system 200. In the inactive state, there are no database operations specified by the transaction that require any further action (e.g. commit, undo, locking or unlocking of resources needed to perform the operations, such as data blocks). On a given database system, a transaction is initially in the inactive state (i.e. inactive state 210 and 250), and eventually transitions to the inactive state upon completion (i.e. inactive states 240 and 290).

A transaction transitions from the inactive state to the active state when a database system receives a "begin transaction" request. For example, client 122 (FIG. 1) may issue a BEGIN TRANSACTION request to database system 110. At step 212, database system 110 receives the begin transaction request and enters active state 220. Next, coordinating database system 110 receives a command to modify data on participating database system 150. In response, at step 221, coordinating database system 110 transmits a request to participating database system 250 to begin a transaction. At step 222, coordinating database system 110 transmits one or more requests to participating database system 150 to modify data on participating database system 150.

At step 252, participating database system 150 receives the request to begin a transaction. Relative to participating database system 150, the transaction enters the active state 260. Afterwards, participating database system 150 receives the request to modify data.

Once a transaction within a database system enters the active state, the database system may receive any number of requests to modify data as part of the transaction. For example, client 122 may issue requests to coordinating database system 110 to modify data on both coordinating database system 110 and participating database system 150. In response to receiving the requests to modify data on participating database system 150, coordinating database system 110 transmits requests to modify data on participating database system 150 to participating database system 150.

At step 223, the coordinating database system receives a request from client 122 to commit the transaction. In response, at step 224, coordinating database system 110 transmits a prepare request to participating database system 150. At step 262, participating database system 150 receives the request.

At step 264, participating database system 150 flushes log 152 (FIG. 1) to non-volatile storage. "Flushing the log" refers to causing the log records of the log that are currently only stored in volatile memory to be stored to non-volatile storage. Thus, flushing the log renders the modifications for participating database system 150 persistent. When the modifications are rendered persistent, participating database system 150 is able to guarantee that it can commit the transaction. Consequently, after step 264, the transaction enters the prepared state. At step 266, participating database system 150 records the transition to the prepared state in log 152 (i.e. creating a log record recording the fact the prepared state has been reached).

At step 272, participating database system 150 transmits a prepared acknowledgment to the coordinating database system 110. A prepared acknowledgment is a message sent by a participating database system that indicates whether or not the participating database system is prepared to commit the transaction. A participating database system is prepared to commit when the transaction is in the prepared state on the participating database system. At step 226, coordinating database system 110 receives the prepared acknowledgment.

At step 228, coordinating database system 110 commits and flushes the log 112. Specifically, coordinating database system 110 creates a log record in log 112 to record the commit. When coordinating database system 110 flushes the log, it renders the commit persistent. When a commit is persistent, the transaction is in the committed state. Thus, after flushing the log, coordinating database system 110 transitions to committed state 230.

After the transaction reaches the committed state, at step 232, coordinating database system 110 transmits to participating database system 110 a forget request. Next, database system 150 forgets the transaction. A forget request is a message sent to a participating database system requesting that the participating database system performing forget processing. Forget processing is the additional operations needed to transition a transaction from the prepared or committed state to the inactive state (e.g. commit the transaction, release resources, and render the transaction inactive).

At step 274, participating database system 150 receives the forget request. At step 276, participating database system commits (including creating a log record to record the commit), and then flushes log 152. At this stage, the transaction enters the inactive state on participating database system 150. At step 282, participating database system 150 releases any remaining locks on resources that were locked by participating database system 150 on behalf of the transaction. At step 284, participating database system 150 transmits a forget acknowledgement to coordinating database system 110. A forget acknowledgement is a message sent by a participating database system acknowledging that forget processing is completed on the participating database system.

At step 234, coordinating database system 110 receives the message acknowledging the forget. At step 236, coordinating database system 110 releases the locks on resources that were locked by coordinating database system 110 on behalf of the transaction. At this stage, the transaction enters the inactive state on coordinating database system 110.

The per transaction cost of the two-phase commit can be measured by the number of transmitted messages and log flushes that are attributable to performing the two-phase commit. Because four messages are attributable to the two-phase commit (i.e. step 221, step 232, step 272, and step 284), the per transaction cost in terms of messages is 4N, where N equals the number of participating database systems. Because one log flush for coordinating database system (i.e. step 228) and two log flushes for each participating database system are attributable to the two-phase commit, the cost in terms of log flushes is 2N+1, where N is the number of participating database systems.

Typically database systems transmit messages to each other through interprocess communication mechanisms, which may occur over a network. Inter-process communication mechanisms are expensive in terms of computer resources. Furthermore, the messages transmitted between the coordinating database system and the participating database systems are part of a handshaking scheme which may cause substantial delay to processing transactions. Specifically, after the coordinating database system transmits the prepare request to each participating database system, the prepare phase does not complete until each participating database system finishes preparing the transaction and transmits a prepared acknowledgement to the coordinating database system. Furthermore, after transmitting a forget request, the commit phase does not complete until each participating database system commits the transaction and transmits a forget acknowledgment to the participating database system. If any participating database system experiences a delay, every database system involved in the transaction experiences the delay.

Each log flush requires a write to non-volatile storage, a task which requires a relatively long period on the computer time scale. Thus, each log flush further contributes to the delay in completing the transaction. Finally, because resources locked for a transaction are not unlocked until the two-phase commit is complete, any delay increases the amount of time other processes will have to wait for those resources.

Based on the foregoing, it is clearly desirable to provide a method which reduces the number messages, handshaking, and log flushes required to complete a transaction under a two-phase commit.

SUMMARY OF THE INVENTION

A method and apparatus for performing a two-phase commit is described. According to an aspect of the present invention, a coordinating database system determines whether a particular participating database system is prepared to commit a transaction without transmitting a prepare request to the participating database system. For example, to determine whether a particular participating database system is prepared to commit, the coordinating database system examines external log tracking data that resides on the coordinating database system. External log tracking data, which indicates various states of logs on other database systems, is used to determine whether or not a particular participating database system is prepared to commit. Specifically, the external log tracking data indicates which log records have been written to non-volatile storage on participating database systems. The coordinating database system uses this data to determine whether all log records generated for a transaction that is being coordinated by the coordinating database system have been written to non-volatile storage at a particular participating database system. If all log records for a particular transaction have not been written to non-volatile storage at a participating database system, then the participating database system is not prepared to commit. Accordingly, the coordinating database system transmits a prepare request to the participating database system. If however, the coordinating database system has been able to determine that the participating database system is prepared based on the log tracking data stored at the coordinating database system, then there is no need to transmit a prepare request. The coordinating database system presumes that the participating database system is prepared to commit, and does not send a prepare request.

BRIEF DESCRIPTION OF THE DRAWINGS

The present invention is illustrated by way of example, and not by way of limitation, in the figures of the accompanying drawings and in which like reference numerals refer to similar elements and in which:

FIG. 3C is a block diagram depicting an exemplary forget collector according to an embodiment of the present invention;

DETAILED DESCRIPTION OF THE PREFERRED EMBODIMENT

Figure 1:
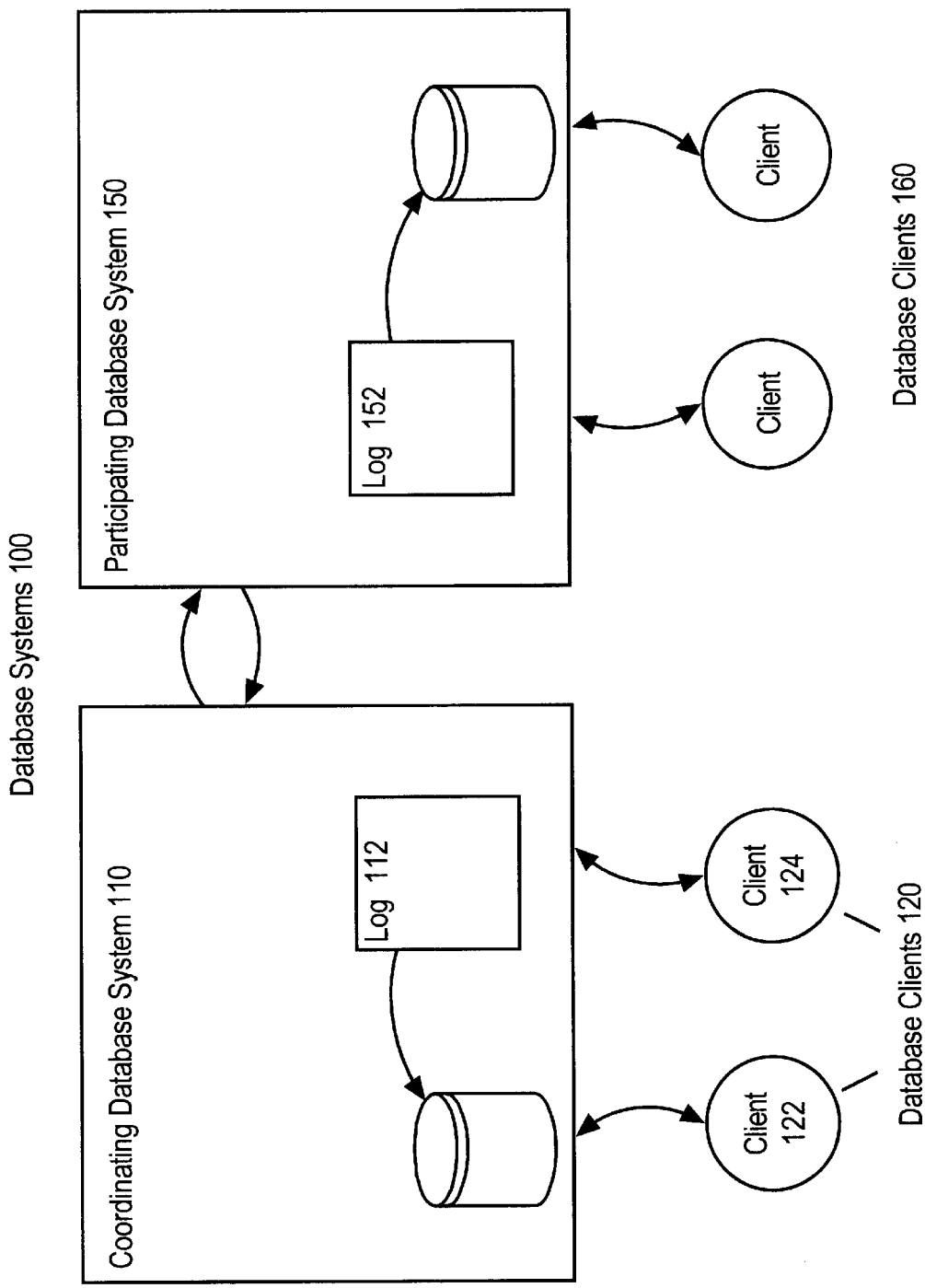
FIG. 1 is a block diagram showing an exemplary distributed database system used to demonstrate the conventional method of performing a two phase commit.
Figure 2:
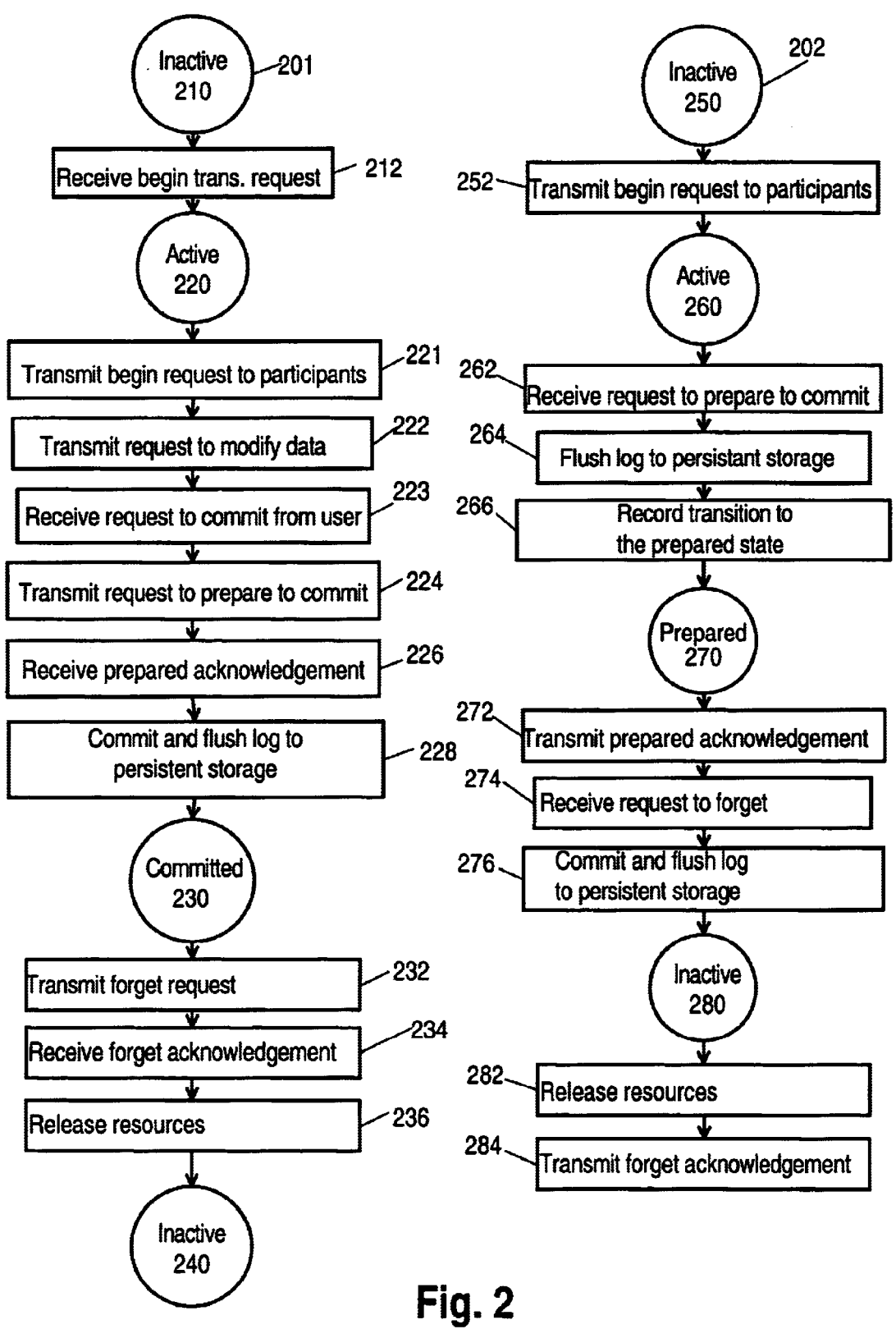
FIG. 2 is a block diagram depicting the phases of a transaction within a coordinating database system and participating database system during a two-phase commit.

A method and apparatus for performing a two-phase commit is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Functional Overview

The mechanisms described herein perform a two-phase commit in a manner that reduces the number of messages transmitted between a coordinating database system and the participating database systems, and the number of log flushes performed to complete a two-phase commit.

To determine whether a particular participating database system is prepared to commit, a coordinating database system first examines external log tracking data that resides on the coordinating database system. External log tracking data, which indicates various states of logs on other database systems, is used to determine whether or not a particular participating database system is prepared to commit. For example, external log tracking data on a coordinating database system indicates which log records have been written to non-volatile storage on participating database systems. The coordinating database system uses this data to determine whether all log records generated for a transaction that is being coordinated by the coordinating database system have been written to non-volatile storage at a particular participating database system. If all log records for a particular transaction have not been written to non-volatile storage at a participating database system, then the participating database system is not prepared to commit. Accordingly, the coordinating database system transmits a prepare request to the participating database system. If however, the coordinating database system has been able to determine that the participating database system is prepared based on the log tracking data stored at the coordinating database system, then there is no need to transmit a prepare request. The coordinating database system presumes that the participating database system is prepared to commit, and does not send a message (i.e. prepare request).

When the coordinating database system determines that all participating database systems are prepared to commit, it commits the transaction. Specifically, the coordinating database system records the commit and a list of the participating database systems in its log. Next, the coordinating database system flushes the log. Forget requests are then transmitted to each of the participating database systems. Rather than waiting to receive a forget acknowledgment and performing other forget processing operations, the coordinating database system delegates this work to a forget collector. A forget collector is a set of one or more processes dedicated to performing forget processing for multiple transactions on behalf of a database system. After delegating this work to a forget collector, the coordinating database system transmits a message to the user indicating that the whole transaction is committed.

Note that the message to the user is transmitted even though no participating database systems may have transmitted a forget acknowledgment to the forget collector. The commit acknowledgement may be sent by the coordinating database system prior to receiving the forgot acknowledgements, and the user may proceed as if the whole transaction is committed on all database systems, because the participating database systems are prepared to commit.

When a participating database system receives a forget request for a transaction, it commits the transaction by generating a commit record in its log. Rather than flushing the log to make the commit persistent, and performing other forget processing operations, the participating database system hands off this work to a forget collector. Because other activity occurring on a database system causes a log flush, the forget collector simply waits until it detects that the commit record has been incidentally written to non-volatile storage by some other activity. Such other activity includes, for example, a log flush performed to commit another transaction in which the participating database system is performing as the coordinating database system.

When the forget collector on the participating database system detects that the commit record of a transaction has been written to non-volatile storage, it performs forget processing for the transaction. This includes transmitting a forget acknowledgment to the coordinating database system.

The forget collector may be performing forget processing on behalf of multiple transactions, a subset of which may be for a single coordinating database system. When the forget collector detects that the commit records for the subset have been incidentally written to non-volatile storage, it transmits just one forget acknowledgement for the whole subset of transactions.

The mechanisms described herein for performing a two-phase commit provide advantages over the conventional approach for performing a two-phase commit. First, a determination of whether the participating databases are prepared to commit may be made without the exchange of a pair of messages for every participating database system in the distributed transaction (i.e. the prepare request and the prepared acknowledgement). Thus, the number of messages required to perform a two-phase commit is reduced.

Furthermore, it has been found that participating databases are usually prepared by the time the coordinating database system transmits a prepare request. Thus, latency caused by waiting for prepare acknowledgements from already prepared participating database systems is eliminated.

Another advantage is that a commit acknowledgement is sent to the user without having to wait for the participating database system to finish forget processing. This eliminates the latency caused by waiting for the participating database system to finish forget processing. Yet another advantage is that the forget collector simply waits for the writing of a commit record to non-volatile storage, rather than causing an additional log flush for sole purpose of ensuring that a commit record is written to non-volatile storage. Thus, one log flush is eliminated for each participating database system involved in a transaction. Finally, forget acknowledgement may be generated for multiple transactions, further reducing the number of messages needed to perform a two-phase commit.

Exemplary Distributed Database System

Figure 3A:
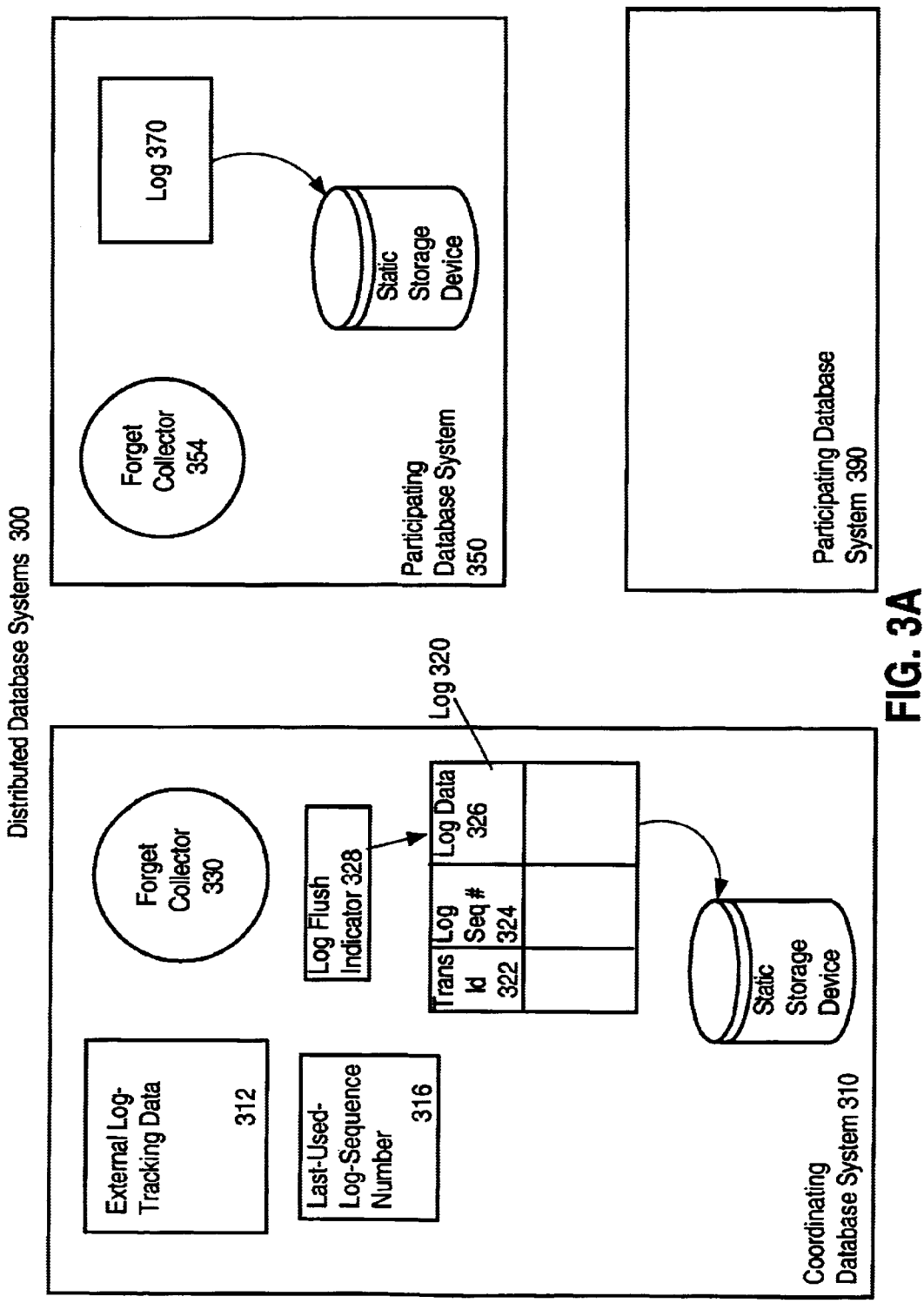
FIG. 3A is a block diagram depicting an exemplary distributed database system upon which an embodiment of the present invention may be implemented.

FIG. 3A shows a distributed database system upon which an embodiment of the present may be implemented. Distributed database system 300 includes coordinating database system 310 and participating database systems 350 and 390. It should be noted that, for a particular transaction, any of database systems 300 may play the role of a coordinating database system and participating database system. However, techniques described herein for performing a two-phase commit are illustrated using a transaction in which database system 310 performs the role of the coordinating database system. For convenience, database systems 300 have been labeled accordingly. For other transactions, database system 310 may play the role of participating database system, and database system 350 or database system 390 may perform the role of coordinating database system.

Database systems 300 communicate with each other using interprocess communication mechanisms, including interprocess communication mechanisms providing communications over a network. Such mechanisms include the use of SQLLIB™ and OCI™ routines supplied by and available from Oracle Corporation. The routines communicate with each other using SQL*Net® networking software from Oracle Corporation. Communications occurring between each of database systems 300 may include (1) requests for relational data in a database (e.g. queries) and the return of the requested data, (2) a request for a database system to prepare a transaction and a prepared acknowledgment, and (3) a request to a database system to update data and a message indicating whether or not the requested data was updated.

Database systems 310 include log 320. Log 320 contains multiple log records. Each log record includes a transaction id field 322, a log sequence number 324, and log data 326. Transaction id field 322 is data which identifies a transaction with which a log record is associated. Log sequence number 324 is a sequence number assigned to each log record. Log records are added to log 320 sequentially, and the log sequence number 324 of a particular log record reflects the order in which the log record was created. Log data 326 is a field which varies according to the type of a log record. For example, if a log record is a redo record, then log data 326 contains new values resulting from a modification. If a log record is an undo record (i.e. a log record which specifies how to roll back modifications), then the log data 326 may contain old values that were modified. If a log record is a commit record, then log data contains commit data. Commit data is data that is used to record a commit of a transaction, and may include a system commit number (i.e., a sequential number assigned to the commit), and a list of the participating database systems for the transaction.

Log flush indicator 328 is data which indicates the last log record to be written to non-volatile storage. For example, log flush indicator 328 may contain the log sequence number of the log record that (1) has been written to non-volatile storage and (2) all previously created log records have been written to non-volatile storage.

Last-Used-Log-Sequence-Number Table 316 is a data structure maintained for each transaction on the coordinating database system. A last-used-log-sequence-number is the highest log sequence number associated with any log record generated for a particular transaction on a particular database system. For a given transaction, last-used-log-sequence-number table 316 indicates the last-used-log-sequence-number for each participating database system in a transaction.

Figure 3B:
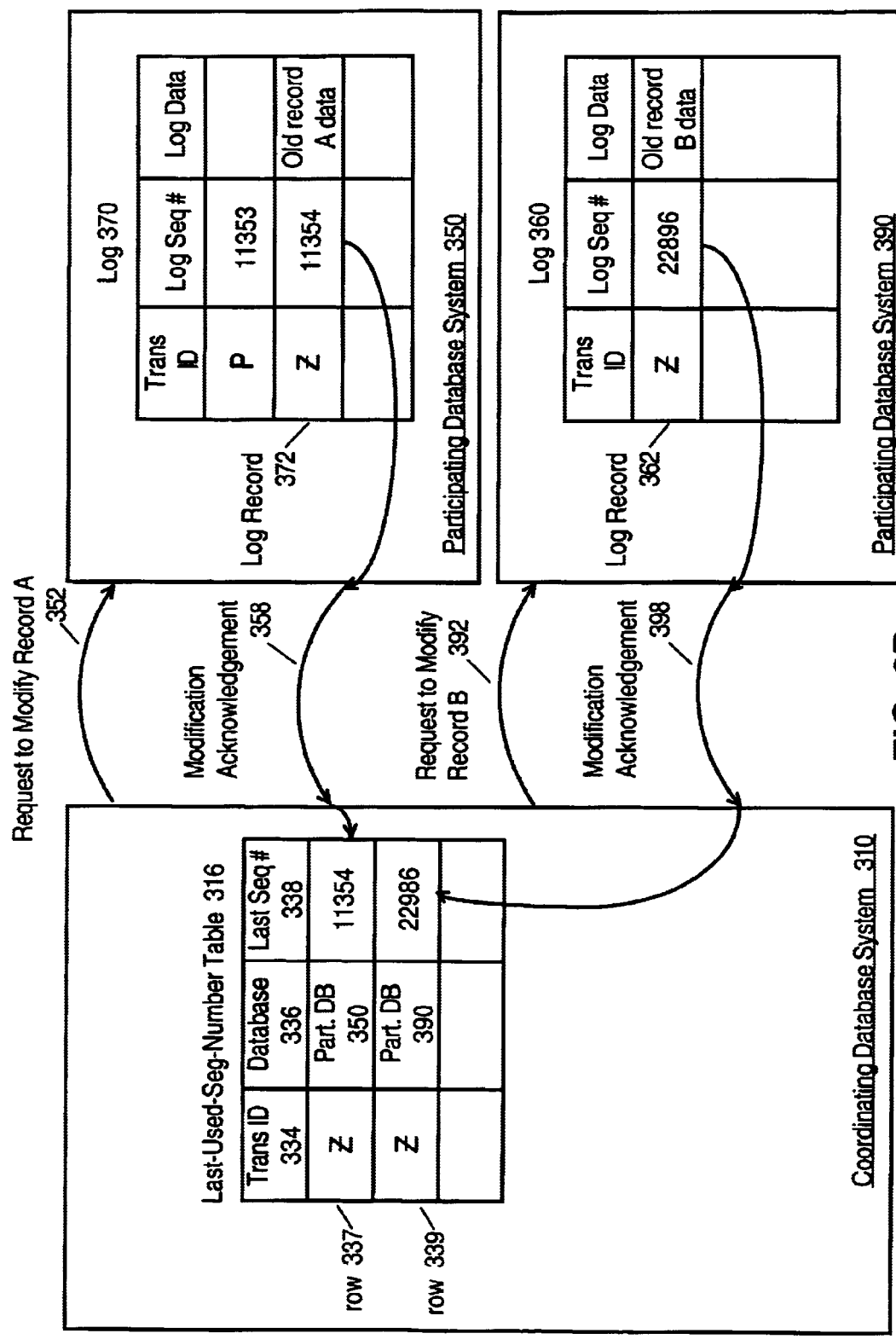
FIG. 3B is a block diagram depicting an exemplary distributed database used to illustrate how a last-used-log-sequence-number table is maintained according to an embodiment of the present invention.

FIG. 3B shows Last-Used-Log-Sequence-Number Table 316 in greater detail, and various entities that participate in maintaining Last-Used-Log-Sequence-Number Table 316. Last-Used-Log-Sequence-Number Table 316 includes three fields, Transaction Id 334, Database 336, and Last Seq #338. A row in Last-Used-Log-Sequence-Number Table 316 specifies the last-used-log-sequence-number for a particular transaction on a particular database. For a given row, Trans-id 334 specifies a particular transaction, database 336 specifies a particular database, and Last Seq #338 specifies the highest log sequence number for the particular transaction and for database. For example, row 337 specifies that 11354 is the last-used-log-sequence-number for transaction Z on participating database system 350.

To track the last used sequence number for a participating database, a coordinating database system receives the last used sequence number from the participating database system. The last used sequence number is received as part of the acknowledgment message returned to the coordinating database system in response to its request to modify data on the participating database system. The coordinating database system then uses the just received last-used-log-sequence-number to update the last-used-log-sequence-number table 316.

The entities in FIG. 3B shall now be used to illustrate how Last-Used-Log-Sequence-Number Table 316 may be maintained. For purposes of illustration, coordinating database 310 is coordinating transaction Z. In the course of coordinating transaction Z, coordinating database system 310 transmits two requests to modify data, one request to participating database system 350 to employee.modify a record A in a table AA (not shown), and another to participating database system 390 to modify a record B in a table BB (not shown). No further requests to modify data are sent by coordinating database system 310 to participating database systems 350 and 390.

While in the process of modifying the record A in table AA, participating database system 350 generates a log record in its log 370 specifying with a log sequence number of 11354. Next, participating database system 350 transmits modification acknowledgement 358 to coordinating database system 310. Modification acknowledgment 358 acknowledges that the modification requested by coordinating database system 310 is complete. In addition, the message includes the last log sequence number generated for the modification, which is 11354. Likewise, while in the process of modifying the record B in table BB, participating database system 390 generates a log record in its log 360 with a log sequence number of 22896. Participating database system 390 transmits a modification acknowledgement 398, which also contains the last log sequence number generated for the modification on participating database system 390, i.e. 22896.

When coordinating database system 310 receives modification acknowledgements 358 and 398, coordinating database system 310 then modifies forrows 337 and 339 in Last-Used-Log-Sequence-Number Table 316 accordingly. For transaction Z row 337 specifies that the last-used-log-sequence-number for coordinating database system 350 is 11354, row 339 specifies that the last-used-log-sequence-number for coordinating database system 3540 is 22896.

External Log Tracking

External log tracking data 312 indicates various states of the logs used on database systems other than the database system 310. In one embodiment of the present invention, external log tracking data 312 includes, for each other database system within database systems 300, the last used log number and the last written log record. For a particular database system, the last written log record is data indicating the last log record written to non-volatile storage. For example, the last written log record may include the log sequence number of the log record most recently written to non-volatile storage.

To maintain external log tracking data, coordinating database system 310 receives information about which log records have been persistently stored in other database systems. This information may come to database system 310 piggybacked to the various messages exchanged with other database systems. For example, when coordinating database system 310 requests an update to the personnel file on participating database system 350, the request to update the salary information may also include the log sequence number of the last log record in log 320 written to non-volatile storage. Similarly, the acknowledgement message returned by participating database system 350 may include the log sequence number of the last log record in log 370 to be written to non-volatile storage. Other examples of messages that may be used to piggyback information about which log records have been persistently stored includes responses to queries, and prepare requests.

While one mechanism for obtaining log tracking data has been described, alternative mechanisms are possible. For example, log tracking data may be communicated with a message specifically used to transport updates to log tracking data between database systems. Therefore, it is understood that the present invention is not limited to any particular mechanism for exchanging log tracking data between database systems.

The Forget Collector

Forget collector 330 resides on coordinating database system 310, and participating forget collector 354 resides on participating database system 350. A forget collector resides on participating database system 390, but is not shown. After progressing through a two-phase commit to a particular point, a coordinating database system or participating database system transfers the work remaining to complete the two phase commit to a forget collector. As shall be described in more detail, the steps a forget collector performs relative to a particular transaction depends on the role that the forget collector's database system plays in the transaction.

For a particular transaction, the forget collector of the coordinating database system is referred to as the coordinating forget collector. The forget collector of a participating database system is referred to as a participating forget collector. For purposes of illustration, coordinating forget collector 330 is labeled "coordinating" because the techniques described herein for performing a two-phase commit are illustrated using a transaction in which database system 310 is the coordinating database system. For analogous reasons, participating forget collector 354 is labeled "participating".

FIG. 3C shows data structures used by a coordinating or participating forget collector such as forget collector 330. These data structures include transaction participant table 332, which contains data that identifies the participants of a transaction, and that indicates whether the forget collector has received a forget acknowledgement from a particular participating database system for the transaction. A transaction participant table 332 is generated for a transaction when a forget collector receives a message from a coordinating database system to perform forget processing. The message contains data identifying the participants.

A transaction forget list 340 is used by a participating forget collector to manage the forget processing on behalf of a database system for transactions in which the database system is a participating database system. Each record corresponds to one transaction, and includes three fields: transaction id 342, commit log record 344, and coordinator id 346. Transaction id 342 is data which identifies the transaction to which a record corresponds. Commit log record 344 is data which identifies the commit record used to record the commit of the transaction. Commit log record 344 may identify the commit records by, for example, indicating the log sequence number of the commit record. Coordinator id 346 identifies the coordinating database system for the particular transaction. A record is generated in transaction forget list 340 when a forget collector 354 receives a message to perform forget processing for a transaction from the participating database system on which the forget collector 354 resides. The message includes the transaction id, the coordinator id of the coordinating database system for the transaction, and the log sequence number of the commit record generated to record the commit on the participating database system.

For example, assume participating database system 350 is involved in transaction "Z". Furthermore, participating database system 350 transmits a message requesting that forget collector 354 perform forget processing for transaction Z. The message specifies that "Z" is the transaction id, "956" is the log sequence number of the commit record in log 370 generated to record the commit on participating database system 350, and "310" is the coordinator id of coordinating database system 310. Participating forget collector 354 generates record 348, having values "A", 956, and 310 for the fields of transaction id 342, commit log record 344, and coordinator id 346, respectively.

Pre-forget Processing by Coordinating Database System

Figure 4:
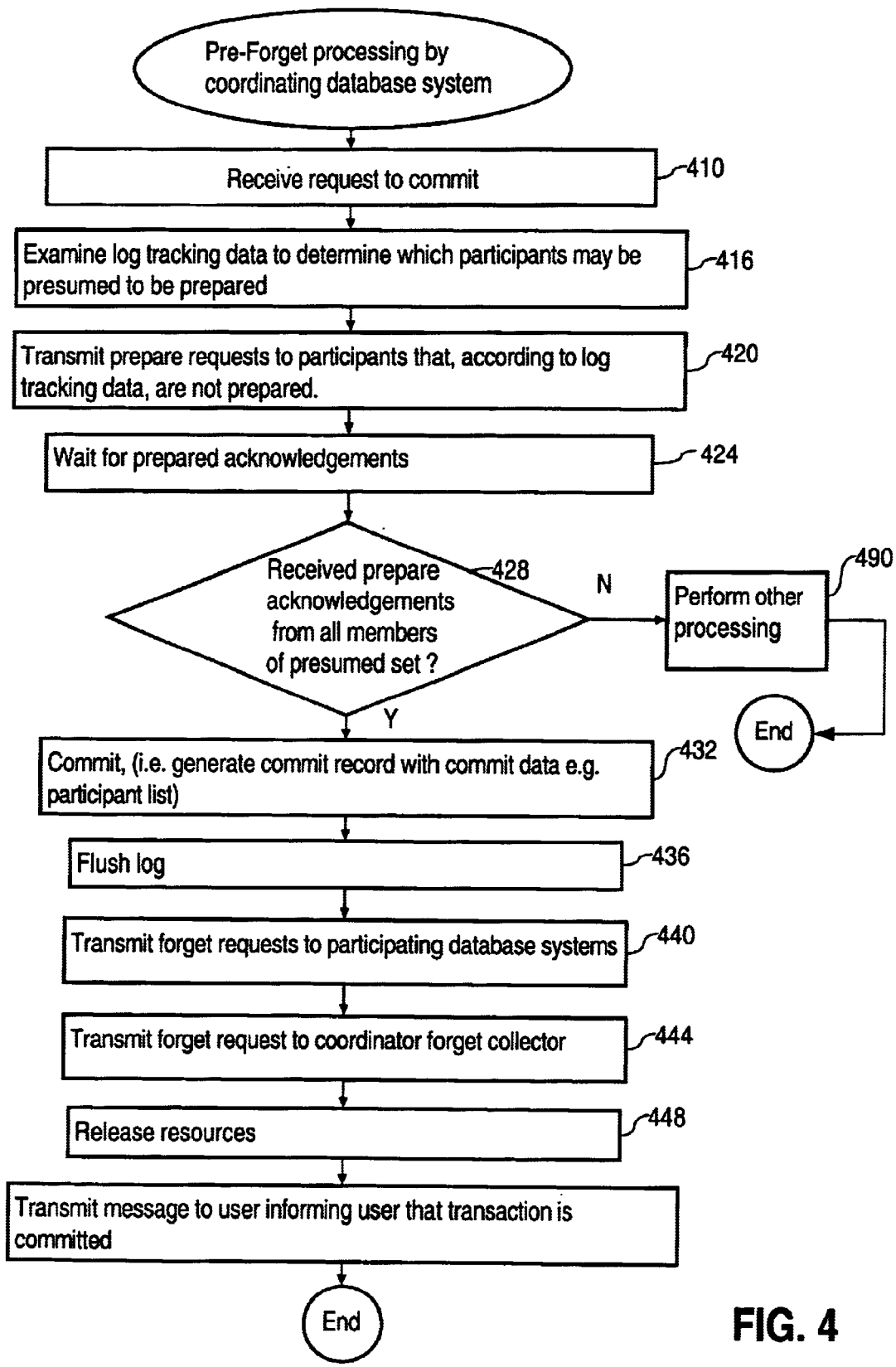
FIG. 4 is a flow chart depicting steps performed by a coordinating database system to commit a transaction according to an embodiment of the present invention.

FIG. 4 shows the steps performed by a coordinating database system to prepare and commit a transaction before transferring the forget processing to a coordinating forget collector. According to the steps shown in FIG. 4, upon receipt of a request to commit a transaction, the coordinating database system determines which of the participating database systems the coordinating database system may presume are prepared to commit. For a given transaction, a participating database system may be presumed to be prepared to commit if the participating database system has written to non-volatile storage the log records that record all modifications specified by a transaction for the participating database system.

The term "unpresumed set" refers to the set of participating database systems which the coordinating database system does not presume are prepared.

The coordinating database system transmits prepare requests to the members of the unpresumed set. Once the members acknowledge that they are prepared, the coordinating database system commits the transaction on the coordinating database system and transmits messages to all the participating database systems requesting that they forget the transaction (i.e. perform forget processing). Finally, the coordinating database system hands over forget processing for the coordinating database system to a forget collector residing on the coordinating database system.

Distributed database systems 300 is used as an example to illustrate the steps of FIG. 4. Assume that coordinating database system 310 is executing a transaction A, which specifies modifications to data residing on participating database systems 350 and 390. Furthermore, coordinating database system 310 has transmitted requests to both participating database system 350 and 390 to modify data specified by transaction A, and that participating database system 350 and participating database system 390 have transmitted messages to coordinating database system 310 acknowledging that the updates have been made. Thus, log records have been generated and log tracking data 312 has been updated accordingly. Relative to transaction A, coordinating database system 310 and participating database systems 350 and 390 are in the active state.

At step 410, a request by a database user to commit a transaction is received. Control then flows to step 416. In this example, coordinating database system 310 receives a request to commit transaction A. Control thus flows to step 410.

At step 416, the external log tracking data 312 is examined to determine whether any participating database systems may be presumed to be prepared to commit. To determine whether it may be presumed that a participating database system is prepared to commit, the coordinating database system searches the last-used-log-sequence-number table 316 to find the last-used-log-sequence-number for the transaction. The last-used-log-sequence-number is compared to the last written log record recorded in external log tracking data 312 for the participating database. If this comparison indicates that the log record with the last-used-log-sequence-number has been written to non-volatile storage, then it may be presumed that the participating database system is prepared.

In this example, the last-used-log-sequence-number table 316 for transaction A specifies that the last-used-log-sequence-number for participating database system 350 is 955, and that the last-used-log-sequence-number for participating database system 390 is 1039. External log tracking data 312 specifies that the last written log record on participating database system 350 has a log sequence number 960, and the last written log record on participating database system 390 has a log sequence number of 1030. Thus, it may be presumed that participating database system 350 is prepared relative to transaction A because, for participating database system 350, the log sequence number of the last written log record is greater than the last-used-log-sequence-number for transaction A on participating database 350 (i.e. 960 is greater than 956). On the other hand, it may not be presumed that participating database system 390 is prepared to commit because the log sequence number of the last written log record for participating database system 390 is not greater than the respective last-used-log-sequence-number for transaction A (i.e. 1030 is not greater than 1039). Thus the unpresumed set includes participating database system 390. Control then flows to step 420.

At step 420, prepare requests are transmitted to the participating database systems in the unpresumed set. In this case, a prepare request is transmitted to participating database system 390.

At step 424, the coordinating database system waits for prepare acknowledgements from each participating database system in the presumed set, acknowledging whether or not the participating database system is prepared to commit. When messages are received from every member of the unpresumed set, or a threshold period of time elapses, control then flows to step 428. In this example, coordinating database system 310 receives a message from participating database system 390 acknowledging that participating database system 390 is prepared.

At step 428, it is determined whether prepared acknowledgements have been received from each member of the unpresumed set. If prepared acknowledgements have been received from all members of the unprepared set prior to the expiration of the time limit, then control flows to step 432, and the transaction is committed on the coordinating database system. Otherwise, control flows to step 490, where other transaction processing is performed. Such other processing may include transmitting a message to the user that the transaction cannot be committed, or performing a rollback the transaction.

At step 432, the transaction is committed on the coordinating database system. Specifically, a commit record is generated within log 320. The commit data within the commit record includes a list of the participating database systems. Control then flows to step 436. In this example, a commit record is generated in log 320 in which the participation collection data specifies participating database system 350 and 390. Control then flows to step 436.

At step 436, the log is flushed. In this example, coordinating database system 310 causes the commit record generated in step 432 to be written to non-volatile storage.

At step 440, the coordinating database system transmits a forget request to each of the participating database systems. In this example, coordinating database system 310 transmits a forget request to participating database systems 350 and 390.

At step 444, the coordinating database system transmits a message to the forget collector residing on the coordinating database system, requesting that the forget collector perform forget processing on behalf of the coordinating database system. The message includes a list of the participating database systems. The forget collector receiving the message becomes the coordinating forget collector with respect to the transaction. Control then flows to step 440. In this example, coordinating database system 310 transmits a message to the forget collector 330 residing on the coordinating database system 310, requesting that forget collector 330 perform forget processing on behalf of the coordinating database system 310. The message contains a list indicating that the participating database systems for this transaction are participating database system 350 and 390.

Once the coordinating database system transmits a message to the coordinating forget collector, responsibility for coordinating the remaining work of the transaction is assumed by the coordinating forget collector. The coordinating forget collector then waits for a forget acknowledgment from each participating database system.

At step 448, the locks on resources locked on behalf of the transaction are released. At step 450, the transition to the inactive status is recorded in log 320. As step 452, a message to the user is sent to indicate that the commit of the transaction is complete. Execution of steps of FIG. 4 ends.

Pre-forget Processing by the Participating Database System

Figure 5:
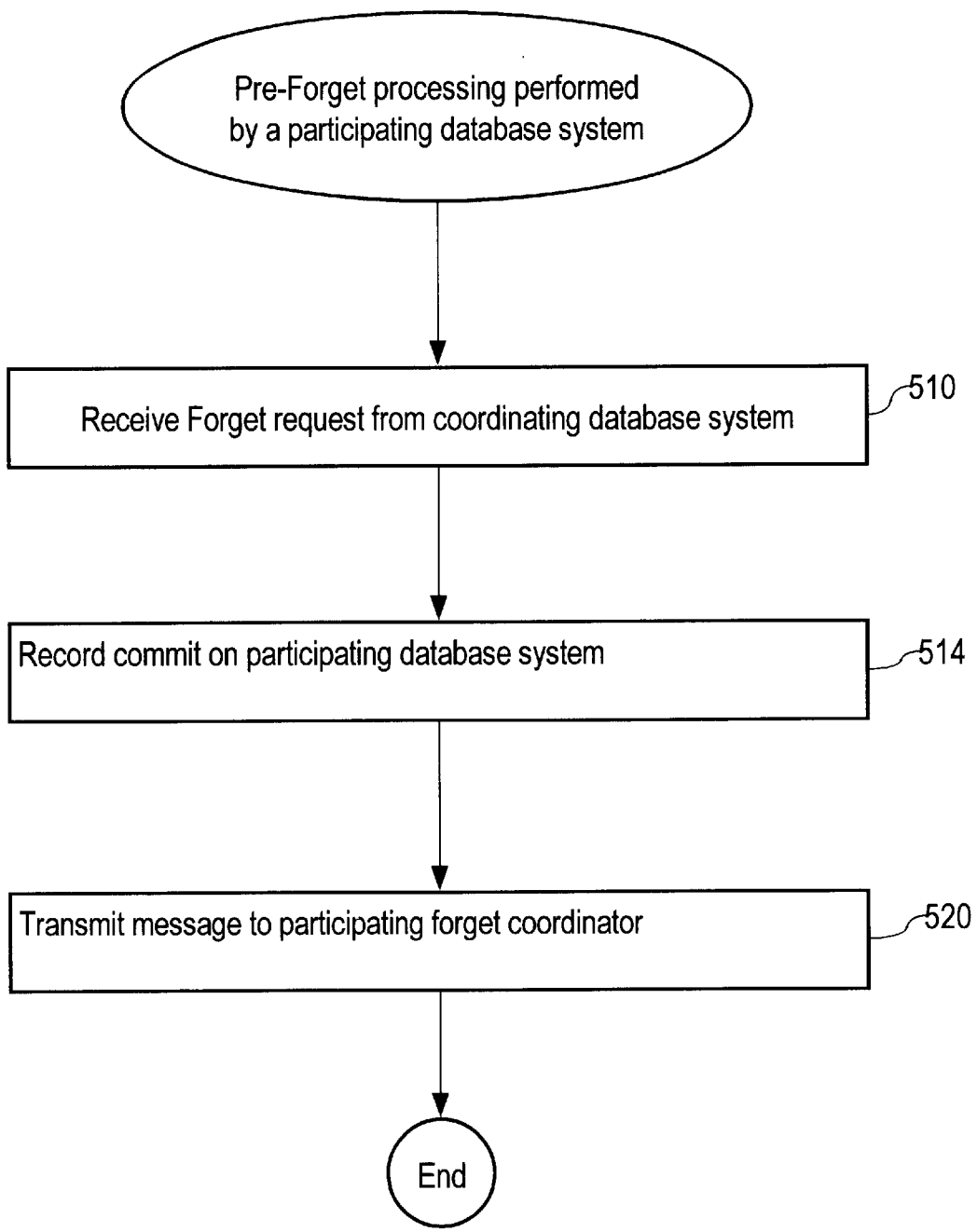
FIG. 5 is a flow chart depicting the steps performed by a participating database system upon receiving a forget request from a coordinating database system according to an embodiment of the present invention.

The flowchart of FIG. 5 shows steps performed by each of the participating database systems upon receipt of a forget request from the coordinating database system. The steps are illustrated by continuing the previous example involving transaction A.

At step 510, a participating database system receives a forget request from the coordinating database system. Control then flows to step 514.

At step 514, the participating database system commits the transaction on the participating database system by generating a commit record in the log of the participating database system. Control then flows to step 520.

At step 520, a request to complete forget processing is transmitted to a forget collector residing on the participating database system. The forget request includes data that specifies values for fields transaction id 342 (FIG. 3C), commit log record 344, coordinator id 346. The forget collector receiving the request becomes a participating forget collector with respect to the transaction. Execution of the steps thus ends.

In this example, participating database system 350 receives a forget request from coordinating database system 310. Next, participating database system 350 commits the transaction (i.e. generates a commit record in log 370), and then transmits a forget request to participating forget collector 354. After transmitting the request to participating forget collector 354, participating forget collector 354 assumes responsibility for performing forget processing on behalf of participating database system 350.

Likewise, participating database system 390 receives a forget request from coordinating database system 310. Next, participating database system 390 commits the transaction on participating database system 390 (i.e. generates a commit record in the log used by participating database system 390), and then transmits a request to the participating forget collector residing on participating database system 390.

Participating Forget Collector

Figure 6:
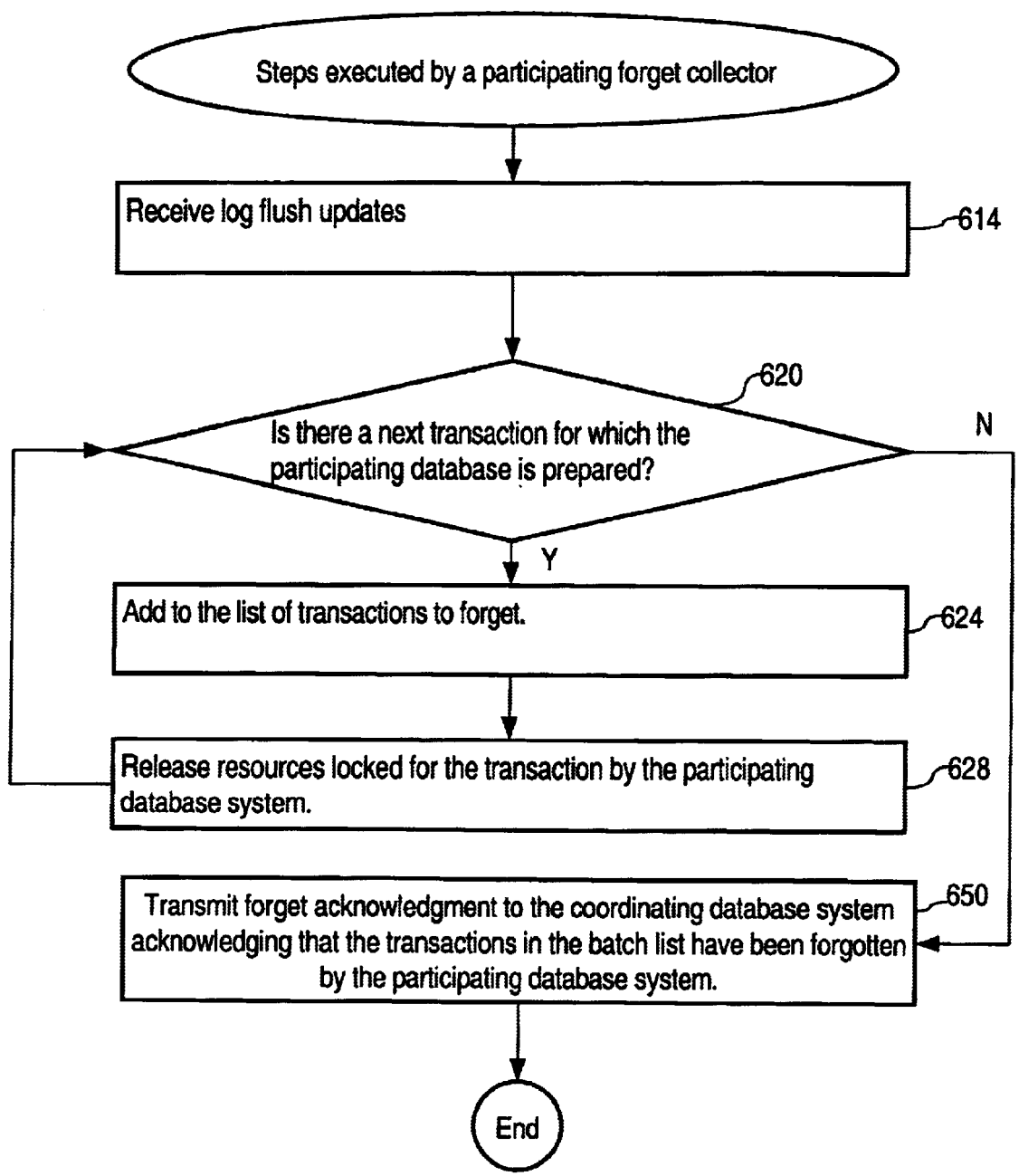
FIG. 6 is a flow chart depicting the steps performed by a participating forget collector according to an embodiment of the present invention.

FIG. 6 shows the steps performed by a participating forget collector for one or more transactions. Before a participating forget collector performs the steps of FIG. 6 for a particular transaction, the participating forget collector receives a request from the participating database system to perform forget processing for the transaction. The participating forget collector adds the transaction to transaction forget list 340, using the data contained in the forget request to populate the fields transaction id 342, commit log record 344, and coordinator id 346. Once the transactions is added, the forget collector monitors the writing of log records to non-volatile storage, detecting whenever the commit record for the transaction is written to non-volatile storage. The forget collector may also be monitoring the writing of log records on behalf of other transactions, transactions for which the forget collector is performing forget processing, and for which commit records have not yet been written to nonvolatile storage.

To monitor the writing of log records, the forget collector receives data indicating which log records have been written to nonvolatile storage. When the data is received, the forget collector determines the set of one or more transactions for which commit records have just been written to nonvolatile storage. The participating forget collector transmits forget acknowledgments to the appropriate coordinating database systems. If a coordinating database system is coordinating for multiple transactions that each belong to the just determined set of transactions, then only one forget acknowledgment is sent to the coordinating database system, the forget acknowledgement specifying the completion of forget processing for the multiple transactions.

At step 614, the participating forget collector receives a log flush update. A log flush update indicates which log records have been flushed on the participating database system. The log flush updates may be transmitted to the participating forget collector by the participating database system when the participating database system flushes the log. To reduce interprocess communication traffic, the transmission of log flushing updates may be limited to every N log flushes, or may be performed at particular intervals of time.

In this example, the participating forget collector receives a log flush update indicating that the last log record flushed on the participating forget collector has a log sequence number of 1050.

Steps 620 through 628 represent a loop where transactions whose commits are persistent on the participating database system (e.g. commit record has been written to non-volatile storage) are added to a transmittal list. A transaction is added to the transmittal list by removing its record from the forget list 340 and adding the record to the transmittal list. In each iteration, a next transaction from the transaction forget list 340 is selected. A next transaction is a previously unselected transaction in the transaction forget list 340 whose commit is persistent.

At step 620, it is determined whether there is a next transaction in transaction forget list 340. If there is no next transaction, then execution of the steps proceeds to step 650. Otherwise, execution of the steps proceeds to step 624.

The determination of whether there is a next transaction is made by scanning the transaction forget list 340 for a record representing a transaction that has not yet been moved from the transmittal list and whose commit record has been written to non-volatile storage. To determine whether the commit record has been written to non-volatile storage, the commit log record field 344 is compared to the log flush update data received in step 614.

In this example, the next transaction is transaction A, the transaction corresponding to record 348. Specifically, the commit log record field 344 of record 348 specifies that the log sequence number for the commit record generated for transaction A is 956. 956 is less than 1050 (the log sequence number of the last log record written to non-volatile storage), and thus the commit record has been written to non-volatile storage. Control thus flows to step 624.

At step 624, the transaction is added to the transmittal list and removed from the transaction forget list 340. In this example, record 348 (the record corresponding to transaction A) is added to the transmittal list and record 348 is removed from the transaction forget list 340.

At step 628, the resources locked for the transaction by the participating database system are released. At step 630, the transition to the inactive state is recorded in the log of the participating database system. Control then returns to step 620.

At step 620, transaction B is the next transaction selected. At step 624, transaction B is added to the transmittal list and record 349 is removed from the transaction forget list 340. At step 628, resources locked for the transaction by the participating database system are released. Control then returns to step 620, where it is determined that there is no next transaction. Control then flows to step 650.

At step 650, a forget acknowledgment is transmitted to each coordinating forget collector having a transaction in the transmittal list. Each forget acknowledgement includes data specifying one or more transactions for the coordinating database system. Thus, each forget acknowledgement may acknowledge the forgetting of multiple transactions.

In this example, a forget acknowledgment is sent to the coordinating forget collector 330. The forget acknowledgment includes data specifying transactions A and transaction B, thus acknowledging that transactions A and B have been forgotten on participating database system 350.

Coordinating Forget Collector

Figure 7:
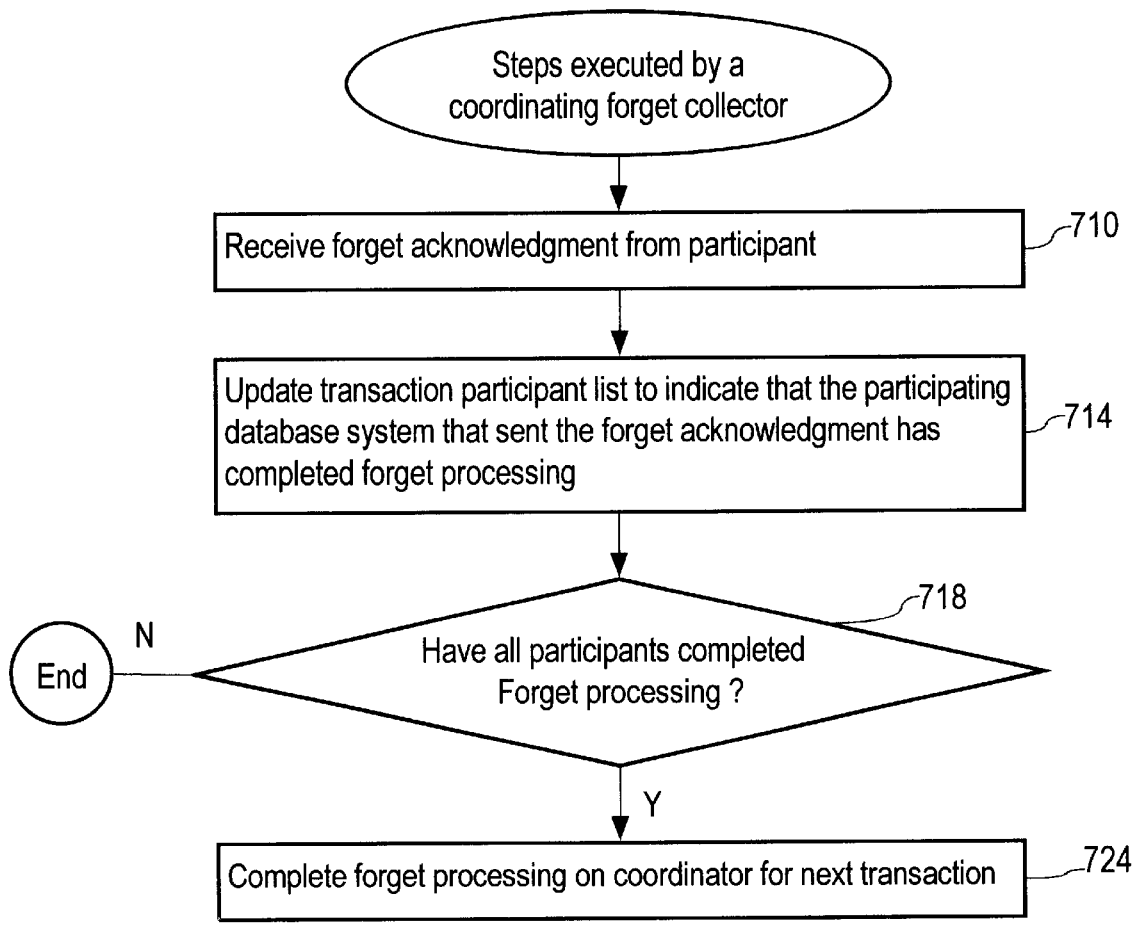
FIG. 7 is a flow chart depicting the steps performed by a coordinating forget collector according to an embodiment of the present invention.

FIG. 7 shows the steps performed by the coordinating forget collector to perform forget processing for a coordinating database system. Forget processing for a coordinating database system involves tracking which participating database system have completed forget processing for a particular transaction. A coordinating forget collector begins forget processing for a particular transaction when the coordinating forget collector receives a forget request from the coordinating database system. The list of participants in the forget request are added to the transaction participant table 332. Once the coordinating forget collector receives forget acknowledgments from all the participating database systems for a given transaction, the coordinating forget collector completes forget processing on the coordinating database system. The steps of FIG. 7 are illustrated by continuing the previous example involving transaction A. Assume that neither participating database system 350 or participating database system 390 have transmitted a forget acknowledgement to coordinating database system 350 for transaction A.

At step 710, the coordinating forget collector receives a forget acknowledgement from a participating database system for a transaction. Control then flows to step 714. In this example, coordinating database system 310 receives a forget acknowledgement from participating database system 350 acknowledging that the participating database system 350 has completed forget processing. Control flows to step 714.

At step 714, the transaction participant table 332 is updated to reflect that the participating database system that sent the acknowledgment has completed forget processing for the transaction. In this example, transaction participant table 332 is updated to reflect that the participating database system 350 sent a forget acknowledgment for transaction A.

At step 718, it is determined whether all participating database systems involved in the transaction have completed forget processing. This determination is made by examining transaction participant table 332. If for every participating database system involved in the transaction participant table 332 indicates a forget acknowledgment was received, then all participating database systems involved in the transaction have completed forget processing. Control then flows to step 724. Otherwise, execution of the steps ceases. In this example, transaction participant table 332 indicates that participating database system 390 has not yet sent a forget acknowledgement. Therefore, execution of the steps ceases.

Continuing with the current example, at step 710, coordinating forget collector 354 receives a forget acknowledgment from participating database system 390. At step 714, the transaction participant table 332 is updated to reflect that the participating database system 390 sent a forget acknowledgment for transaction A. Transaction participant table 332 indicates all participating database systems 390 have sent forget acknowledgements for the transaction. Therefore, control flows to 724.

At step 724, the forget processing for the transaction is completed (including the recording in log 370 of the transition to the inactive state).

Database Recovery

A database system may experience system failures. When this occurs, the database system recovers the database.

Recovering the database includes undoing transactions which have not committed and completing transactions which have committed. The steps involved in recovery entail determining which transactions among those that are not inactive have committed. The determination of whether a transaction is committed depends on whether the database system was playing the role of the coordinating database system or the participating database system.

If the database system was the coordinating database system for a particular transaction, then the coordinating database system may examine its log. If the transaction has not committed, the transaction is undone. Undoing the transaction includes operations such as applying the undo records generated for the transaction on all database systems participating in the transaction.

If, on the other hand the transaction has committed, then forget processing on the coordinating database system for the transaction is completed. As mentioned before, forget processing for a coordinating database system includes coordinating the forget processing on the participating database system. This tasks requires knowledge of which participating database systems are involved. To determine which participating database systems are involved, the coordinating database system examines commit data it generated. As mentioned before, the commit data contains a list of the involved participating database systems.

If the database system was a participating database system, then the determination of whether a transaction has committed involves a variety of considerations. Specifically, if the log on the participating database system indicates that the transaction is committed, then the transaction is considered committed. If the log indicates that the transaction is prepared, then the log data on the coordinating database system is examined to determine whether the transaction has committed.

If the log indicates that the transaction is active, then the log data on the coordinating database system is examined to determine whether in fact the transaction has committed. This approach differs from the conventional two-phase approach, where the database system assumes that active transactions have not committed. The reason for the difference is that under the conventional approach the coordinating database system did not commit a transaction until all participating database systems persistently recorded a transaction's transition to the prepared state in the log of the participating database system. Thus, if the log on the participating database system indicated that the transaction was active (i.e. there is no persistently recorded prepare), then it may be accurately assumed that the transaction had not committed.

On the other hand, a coordinating database system operating according to techniques described herein, may presume that a transaction is prepared on a participating database system. Under this approach, the coordinating database system may commit the transaction without a participating database system persistently recording the transaction's transition to the prepared state. Thus even though the log on a participating database system indicates that a transaction is active, the log of the coordinating database system may indicate that in fact the transaction has committed. It is the log on the coordinating database system that truly reflects whether the transaction has committed.

The process of recovery described above involved determining the recorded state of a transaction. To make this determination, data logs were examined. However it is not necessary to examine log data to determine the state of a transaction. Information indicating the state of the transaction may be found in other data structures used by a database system. For example, a transaction table may be examined to determine the state of a transaction. A transaction table is used to reflect the current state of a transaction. A transaction table may contain data that indicates the transaction id, the coordinating database system, and the current state of the transaction for the database system on which the transaction table resides.

Hardware Overview

Figure 8:
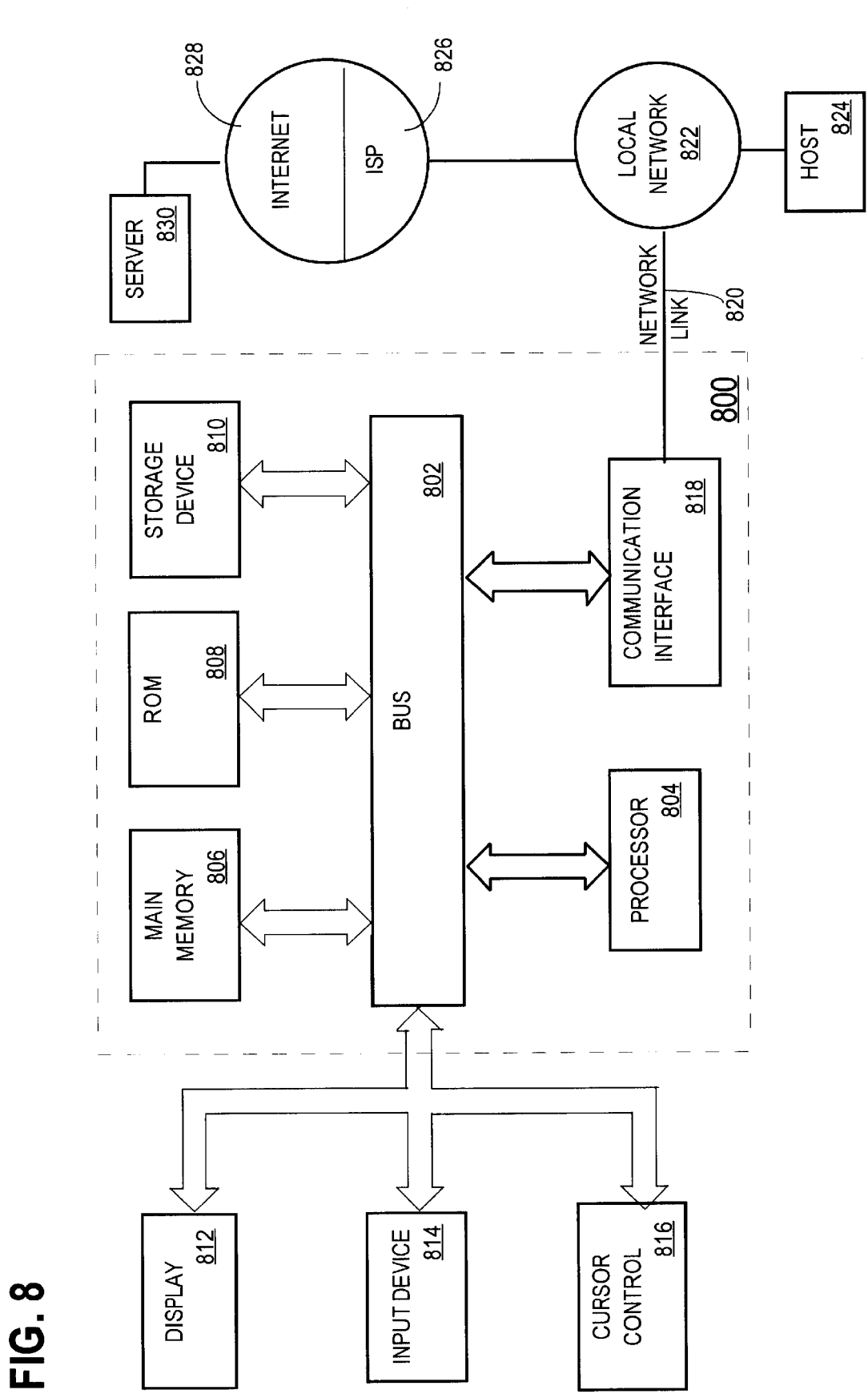
FIG. 8 is a block diagram depicting a computer system upon which an embodiment of the present invention may be implemented.

FIG. 8 is a block diagram that illustrates a computer system 800 upon which an embodiment of the invention may be implemented. Computer system 800 includes a bus 802 or other communication mechanism for communicating information, and a processor 804 coupled with bus 802 for processing information. Computer system 800 also includes a main memory 806, such as a random access memory (RAM) or other dynamic storage device, coupled to bus 802 for storing information and instructions to be executed by processor 804. Main memory 806 also may be used for storing temporary variables or other intermediate information during execution of instructions to be executed by processor 804. Computer system 800 further includes a read only memory (ROM) 808 or other static storage device coupled to bus 802 for storing static information and instructions for processor 804. A storage device 810, such as a magnetic disk or optical disk, is provided and coupled to bus 802 for storing information and instructions.

Computer system 800 may be coupled via bus 802 to a display 812, such as a cathode ray tube (CRT), for displaying information to a computer user. An input device 814, including alphanumeric and other keys, is coupled to bus 802 for communicating information and command selections to processor 804. Another type of user input device is cursor control 816, such as a mouse, a trackball, or cursor direction keys for communicating direction information and command selections to processor 804 and for controlling cursor movement on display 812. This input device typically has two degrees of freedom in two axes, a first axis (e.g., x) and a second axis (e.g., y), that allows the device to specify positions in a plane.

The invention is related to the use of computer system 800 for performing a two-phase commit. According to one embodiment of the invention, a two-phase commit is provided by computer system 800 in response to processor 804 executing one or more sequences of one or more instructions contained in main memory 806. Such instructions may be read into main memory 806 from another computer-readable medium, such as storage device 810. Execution of the sequences of instructions contained in main memory 806 causes processor 804 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 804 for execution. Such a medium may take many forms, including but not limited to, non-volatile media, volatile media, and transmission media. Non-volatile media includes, for example, optical or magnetic disks, such as storage device 810. Volatile media includes dynamic memory, such as main memory 806. Transmission media includes coaxial cables, copper wire and fiber optics, including the wires that comprise bus 802. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 804 for execution. For example, the instructions may initially be carried on a magnetic disk of a remote computer. The remote computer can load the instructions into its dynamic memory and send the instructions over a telephone line using a modem. A modem local to computer system 800 can receive the data on the telephone line and use an infra-red transmitter to convert the data to an infra-red signal. An infra-red detector can receive the data carried in the infra-red signal and appropriate circuitry can place the data on bus 802. Bus 802 carries the data to main memory 806, from which processor 804 retrieves and executes the instructions. The instructions received by main memory 806 may optionally be stored on storage device 810 either before or after execution by processor 804.

Computer system 800 also includes a communication interface 818 coupled to bus 802. Communication interface 818 provides a two-way data communication coupling to a network link 820 that is connected to a local network 822. For example, communication interface 818 may be an integrated services digital network (ISDN) card or a modem to provide a data communication connection to a corresponding type of telephone line. As another example, communication interface 818 may be a local area network (LAN) card to provide a data communication connection to a compatible LAN. Wireless links may also be implemented. In any such implementation, communication interface 818 sends and receives electrical, electromagnetic or optical signals that carry digital data streams representing various types of information.

Network link 820 typically provides data communication through one or more networks to other data devices. For example, network link 820 may provide a connection through local network 822 to a host computer 824 or to data equipment operated by an Internet Service Provider (ISP) 826. ISP 826 in turn provides data communication services through the world wide packet data communication network now commonly referred to as the "Internet" 828. Local network 822 and Internet 828 both use electrical, electromagnetic or optical signals that carry digital data streams. The signals through the various networks and the signals on network link 820 and through communication interface 818, which carry the digital data to and from computer system 800, are exemplary forms of carrier waves transporting the information.

Computer system 800 can send messages and receive data, including program code, through the network(s), network link 820 and communication interface 818. In the Internet example, a server 830 might transmit a requested code for an application program through Internet 828, ISP 826, local network 822 and communication interface 818. In accordance with the invention, one such downloaded application provides for performing a two-phase commit as described herein.

The received code may be executed by processor 804 as it is received, and/or stored in storage device 810, or other non-volatile storage for later execution. In this manner, computer system 800 may obtain application code in the form of a carrier wave.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method of providing atomicity for transactions executing on a database system, the method comprising the steps of:

a coordinating database system receiving a request to begin a transaction;

said coordinating database system transmitting a first request specifying a first set of modifications to data in a first database as part of said transaction;

said coordinating database system transmitting a second request specifying a second set of modifications to data in a second database system as part of said transaction;

said coordinating database system receiving log tracking data that indicates which modifications on said first database system and said second database system are recorded in log records stored to non-volatile storage; and said coordinating database system determining whether said log tracking data indicates that said first set of modifications are recorded in log records stored in non-volatile storage.

2. The method of claim 1, the method further including the steps of:

if said log tracking data does not indicate that said first set of modifications are recorded in log records stored in non-volatile storage, then said coordinating database system transmitting a prepare request for said transaction to said first database system;

said coordinating database system receiving a message from said first database system indicating that said first database system is prepared to commit said transaction;

said coordinating database system determining whether said log tracking data indicates that said second set of modifications are recorded in log records stored in a non-volatile storage device; and in response to (1) receiving said message from said first database system, and (2) determining that said log tracking data indicates that said second set of modifications are recorded in log records stored in non-volatile storage device, said first database system committing said transaction on said first database system.

3. A computer-readable medium carrying one or more sequences of one or more instructions for providing atomicity for transactions executing on a database system, the one or more sequences of one or more instructions including instructions which, when executed by one or more processors, cause the one or more processors to perform the steps of:

a coordinating database system receiving a request to begin a transaction;

said coordinating database system transmitting a first request specifying a first set of modifications to data in a first database as part of said transaction;

said coordinating database system transmitting a second request specifying a second set of modifications to data in a second database system as part of said transaction;

said coordinating database system receiving log tracking data that indicates which modifications on said first database system and said second database system are recorded in log records stored to non-volatile storage; and said coordinating database system determining whether said log tracking data indicates that said first set of modifications are recorded in log records stored in non-volatile storage.

4. The computer-readable medium of claim 3, the computer-readable medium further including sequences of instructions for performing the steps of:

if said log tracking data does not indicate that said first set of modifications are recorded in log records stored in non-volatile storage, then said coordinating database system transmitting a prepare request for said transaction to said first database system;

said coordinating database system receiving a message from said first database system indicating that said first database system is prepared to commit said transaction;

said coordinating database system determining whether said log tracking data indicates that said second set of modifications are recorded in log records stored in a non-volatile storage device; and in response to (1) receiving said message from said first database system, and (2) determining that said log tracking data indicates that said second set of modifications are recorded in log records stored in non-volatile storage device, said first database system committing said transaction on said first database system.

5. A distributed database system comprising:

a coordinating database system configured to receive a request to begin a transaction;

said coordinating database system configured to transmit a first request specifying a first set of modifications to data in a first database as part of said transaction;

said coordinating database system configured to transmit a second request specifying a second set of modifications to data in a second database system as part of said transaction;

said coordinating database system configured to receive log tracking data that indicates which modifications on said first database system and said second database system are recorded in log records stored to nonvolatile storage; and said coordinating database system configured to determine whether said log tracking data indicates that said first set of modifications are recorded in log records stored in non-volatile storage.

6. The distributed database system of claim 5, wherein:

said coordinating database system is configured to transmit a prepare request for said transaction to said first database system if said log tracking data does not indicate that said first set of modifications are recorded in log records stored in non-volatile storage;

said coordinating database system is configured to receive a message from said first database system indicating that said first database system is prepared to commit said transaction;

said coordinating database system is configured to determine whether said log tracking data indicates that said second set of modifications are recorded in log records stored in a non-volatile storage device; and said first database system is configured to commit said transaction on said first database system in response to (1) receiving said message from said first database system, and (2) determining that said log tracking data indicates that said second set of modifications are recorded in log records stored in non-volatile storage device.

* * * * *